June 22, 1954

W. L. McCLURE 2,681,833

CONDUIT FOR ELEVATING CONTACT MATERIAL

Filed Jan. 2, 1952

INVENTOR.
WILLIAM L. McCLURE

BY

*Busser and Smith*

ATTORNEYS

Patented June 22, 1954

2,681,833

UNITED STATES PATENT OFFICE 2,681,833

CONDUIT FOR ELEVATING CONTACT MATERIAL

William L. McClure, Toledo, Ohio, assignor to Sun Oil Company, Philadelphia, Pa., a corporation of New Jersey Application January 2, 1952, Serial No. 264,473

2 Claims. (Cl. 302—53)

This invention relates to a system and apparatus for moving pneumatically granular or pelleted contact material or catalyst from a lower receptacle which receives the material in a continuous stream upwardly into and through an elongate conduit to an upper receptacle. In particular the invention is directed to the method of an apparatus for supplying gas or air to the material in the lower receptacle in order to convey it therefrom to and through the elongate conduit in such a manner as to reduce attrition of the material particles or pellets to a minimum during its passage to the upper receptacle.

It is well known in the art of catalysts, such as the cracking of heavier petroleum fractions to gasoline and other hydrocarbon processing operations, to use a catalytic or contact material in a continuous system. In such continuous systems a conversion zone is operated simultaneously with a second zone which is in regeneration. Most commercial moving or continuous catalyst systems have the conversion zone and regeneration zone in superposed relationship with the conversion zone usually above the regeneration zone so that the catalyst or contact material moves through the conversion zone to the regeneration zone by gravity and after regeneration it is carried upwardly and returned to the conversion zone to repeat the cycle of operation. To return the catalyst or contact material from the lower regenerating zone to the upper conversion zone two well known means applicable to the transportation of granular solids from one locus to another have been used, namely: by mechanical conveyors and by pneumatic conveyors, in the latter of which air, steam or flue gas produced at the refinery is readily available as the pneumatic lifting medium.

It is necessary in systems employing conversion and regeneration zones in superposed relationship to convey the catalyst or contact material which is usually in pelleted or granular form through a conduit several hundred feet in length in order to return it from the lower reaction zone to the upper reaction zone. From the lower reaction zone the material is delivered by gravity to a receptacle positioned at a level below that of the lower reaction zone, from which receptacle it is designed to effect or begin the lifting or upward conveying operation. In a pneumatic lifting system this lowermost receptacle is generally known in the art as an engager since the material is engaged therein by the lifting flue gas or air to effect the lifting operation. The lower end of the air lift conduit extends into or is in communication with the engager receptacle while the upper end of the lift conduit communicates with an upper receptacle positioned at a level above the top of the upper reaction zone or chamber. The upper receptacle is designed so that the lifting medium is separated from the catalyst or contact material and is generaly known as the disengager.

The present invention involves a new way of conveying the catalyst, and at the same time introducing a high velocity lifting fluid, to the lower end of the lift conduit, so that the catalyst, after its conveyance to the lift conduit, will be conveyed by the lifting fluid upward through the lift conduit in a manner to reduce attrition of the catalyst to a minimum.

A complete understanding of the present invention may be had by reference to the following description taken in connection with the accompanying drawings which form a part of the application in which.

Figure 1:
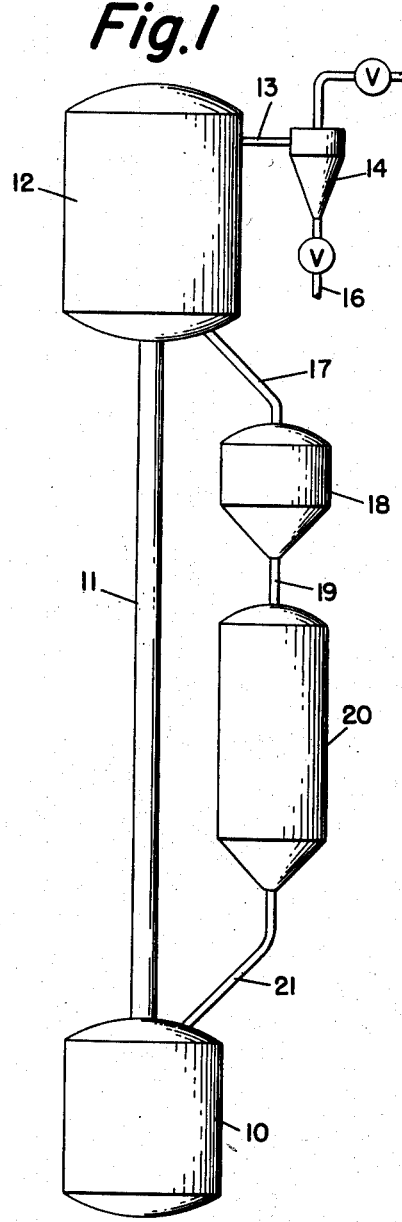
Figure 1 is an elevational view for schematically showing a typical catalytic cracking system employing a pneumatic lift for elevating pelleted catalyst or contact material.

Referring to Figure 1 of the drawing, which shows diagrammatically the conventional elements of a continuous system, a lower receptacle or chamber 10 functions as a catalyst engaging zone, that is, a zone wherein the catalyst is engaged by the air, flue gas or steam supplied thereto by suitable means. The lift pipe or elevating conduit is indicated at 11 and has its lower end communicating with the chamber 10 and an upper end communicating with an upper chamber 12 which is the disengaging chamber or zone wherein the material is disengaged from the air or other elevating medium. The lifting medium is discharged from the upper chamber 12 through a conduit 13 and is passed to any conventional separating means such as a cyclone separator 14 having an upper conduit 15 in communication therewith to remove the lifting medium and a lower conduit 16 for removing any fines which had been entrained in the lifting medium.

The catalyst which remains in the disengager 12 is returned through conduit 17 by gravity to an upper reaction chamber 18 wherein usually an on-stream reaction is effected to obtain the desired product and continues to flow therefrom through conduit 19 by gravity into a lower reaction chamber 20 wherein the catalyst or contact material is regenerated to remove therefrom any deposits which might have been formed in the upper chamber 18. From the lower chamber 20 the catalyst or contact material continues to flow by gravity through conduit 21 and is returned to the engaging chamber 10. The conduits 17, 19 and 21 through which the catalyst or contact material flows in returning from the disengager 12 to the engager 10 are usually provided with means for supplying steam or other gaseous purging medium thereto in order to prevent reaction products formed in chamber 18 and regeneration fumes formed in chamber 20 from communicating with the other chambers in the unit.

Figure 2:
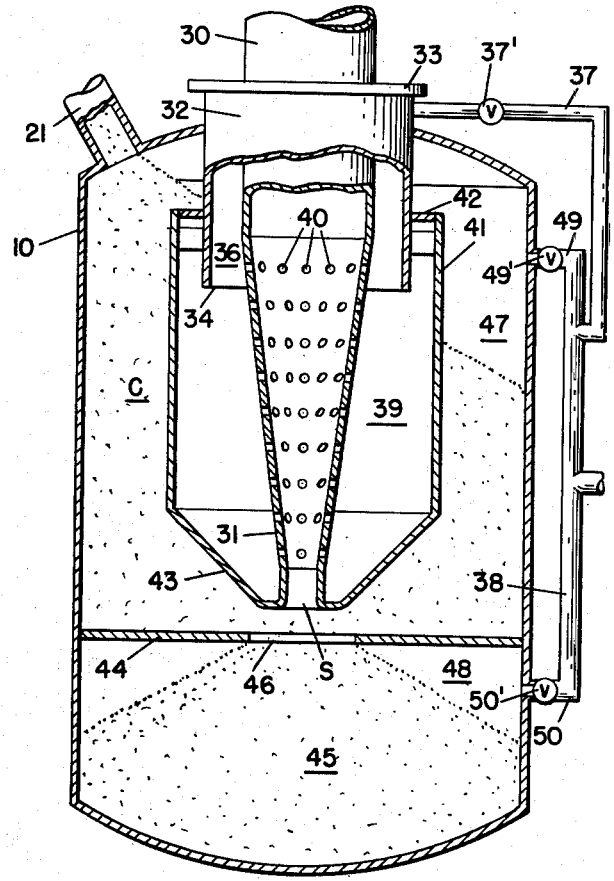
Figure 2 is an enlarged view in sectional elevation showing the invention as applied to the engager portion of the system.

Referring to Figure 2, the engager 10 receives the contact material C through conduit 21, as explained in connection with Figure 1 and the material will acquire an angle of repose which is generally indicated by the dashed lines in Figure 2. The elevating conduit is shown at 30 and has its lower end portion 31 extending into the engager 10. A sleeve 32 is provided about the conduit 30 which is closed at its upper end 33 and open at its lower end 34 providing a space 36 with the elevating conduit to which elevating fluid which may be air, steam or flue gas is supplied through branch conduit 37. The branch conduit 37 is manifolded to a main conduit 38 for supplying all the elevating fluid used in the apparatus.

The elevating conduit of the present invention is arranged to receive the contact material in what is known as "dense phase" by utilizing additional fluid conduits for supplying the fluid at decreased velocity and then after the contact material passes through the inlet of the conduit the lower end portion of the conduit is so adapted as to receive the elevating fluid from branch conduit 37 and to direct it into the dense phase material within the lower portion of the conduit in a manner to transform the dense phase material into dispersed phase to condition it to be elevated continuously and at desired or predetermined velocity through the elevating conduit to the upper chamber. By "dense phase" will be understood that the ratio of contact material to the lifting or elevating fluid will be substantially greater than the ratio of contact material to the elevating fluid in "dispersed phase."

To accomplish this the lower end portion 31 of the elevating conduit which is positioned within the engager 10 is provided with a plurality of apertures 40 and the end portion 31 of the conduit is preferably tapered outwardly from its lower inlet end to, in effect, progressively increase the apertured areas circumferentially of the conduit from its lower inlet end. A fluid chamber 39 is provided about the apertured portion of the conduit and is formed by a vertical wall 41 having a closed upper end formed by an apertured plate 42 through which the sleeve 32 extends to have its lower open end 34 in communication with the chamber 39 to supply fluid thereto. The chamber 39 is closed at its lower end by a plate 43 which may be disposed at an angle preferably that of the angle of repose of the contact material C. The apertures 40 in the lower end portion 31 of conduit 30 supply the fluid from chamber 39 to the elevating conduit in the form of independent streams or jets.

A transverse plate 44 is positioned below the chamber 39 forming a lower contact material chamber 45, within the engager 10 and the plate is provided with an aperture 46 disposed in general alignment with the inlet end of conduit 30 for the passage of contact material to the chamber 45 from the upper portion of the engager 10.

The plate 44 forms with the lower inlet end of the conduit 30 and the bottom 43 of chamber 39 a zone S into which contact material is directed by utilizing fluid conduits which are in communication with the elevating fluid supply manifold 38. Due to the angle of repose of the contact material fluid spaces 47 and 48 will be formed respectively above the body of material in the upper portion of the engager 10 and above the material in the section 45. The branch fluid conduits 49 and 50 then are placed in communication with the spaces 47 and 48 respectively to supply elevating fluid thereto and direct the contact material into the zone S. Each of the branch fluid conduits 37, 49, and 50 is provided with a valve indicated respectively at $37^1$, $49^1$, and $50^1$ to regulate the supply of elevating fluid from the main conduit or fluid manifold 38. Fluid supplied directly to the contact material by conduits 49 and 50 will be regulated by the valves $49^1$ and $50^1$ so that the contact material will enter the inlet end of conduit 30 in dense phase while the elevating fluid supplied to chamber 39 from space 36 will be regulated in such volume and velocity that the fluid passing through the apertures 40 will transform the dense phase mixture of contact material and fluid to a dispersed phase mixture in order to convey it at desired velocity through the elevating conduit 30 to the disengager 12.

I claim:

1. Apparatus for elevating granular material from a lower chamber to an upper chamber which comprises an upright elevating conduit having its lower inlet extending into said lower chamber and its upper open end extending into the upper chamber, means for supplying contact material to the lower chamber, said conduit having a perforated area therein in its lower end portion, said perforated area tapering progressively outwardly from its lower inlet end, a closed lifting fluid compartment surrounding said perforated area in the elevating conduit, means for supplying a regulated volume of fluid directly to the contact material in the lower chamber to move it in a dense phase mixture of contact material and fluid into the inlet end of the elevating conduit, and lifting fluid supply means for admitting fluid to said fluid compartment for passage through the perforated area in the elevating conduit to transform the dense phase mixture into a dispersed phase mixture for passage to the upper chamber at desired velocity.

2. Apparatus for elevating granular material from a lower chamber to an upper chamber which comprises an upright elevating conduit having its lower inlet extending into said lower chamber and its upper open end extending into the upper chamber, means for supplying contact material to the lower chamber, said conduit having a perforated area in its lower end portion, a closed lifting fluid compartment surrounding said perforated area in the lifting fluid conduit, a transverse partition extending across said lower chamber dividing it into upper and lower contact material sections and said partition having an aperture therein positioned below the inlet end of said elevating conduit providing communication between said sections, fluid supply means in communication with the contact material in the upper section to direct the contact material across the transverse partition in dense phase into the lower end of the elevating conduit, other fluid supply means in communication with the lower section of the chamber to direct contact material therefrom in dense phase into the inlet end of the elevating conduit and means for supplying lifting fluid to said compartment for directing it through the perforated area in the elevating conduit in order to transform the dense phase mixture into a dispersed phase mixture for passage to the upper chamber at desired velocity.

References Cited in the file of this patent

UNITED STATES PATENTS

| Number | Name | Date |
|---|---|---|
| 2,561,771 | Ardern | July 24, 1951 |

FOREIGN PATENTS

| Number | Country | Date |
|---|---|---|
| 276,114 | Germany | Oct. 17, 1913 |
| 288,723 | Germany | Nov. 15, 1915 |
| 7,075 | Netherlands | June 15, 1922 |